United States Patent
Lee et al.

(10) Patent No.: US 9,589,680 B2
(45) Date of Patent: Mar. 7, 2017

(54) NUCLEAR FUEL ROD FOR FAST REACTORS INCLUDING METALLIC FUEL SLUG COATED WITH PROTECTIVE COATING LAYER AND FABRICATION METHOD THEREOF

(71) Applicants: KOREA ATOMIC ENERGY RESEARCH INSTITUTE, Daejeon (KR); KOREA HYDRO & NUCLEAR POWER CO., LTD., Gyeongsangbuk-do (KR)

(72) Inventors: Chan Bock Lee, Daejeon (KR); Jun Hwan Kim, Daejeon (KR); Jong-Hyuk Baek, Daejeon (KR); Jin-Sik Cheon, Daejeon (KR); ByoungOon Lee, Daejeon (KR); Ki Hwan Kim, Daejeon (KR); Sung-Ho Kim, Daejeon (KR); Junehyung Kim, Daejeon (KR); Seok-Jin Oh, Daejeon (KR); Young-Mo Ko, Daejeon (KR); Yoon-Myeong Woo, Daejeon (KR); Seong Woo Yang, Daejeon (KR)

(73) Assignees: Korea Atomic Energy Research Institute, Daejeon (KR); Korea Hydro & Nuclear Power Co., Ltd., Daejeon (KR)

( * ) Notice: Subject to any disclaimer, the term of this patent is extended or adjusted under 35 U.S.C. 154(b) by 575 days.

(21) Appl. No.: 14/079,740

(22) Filed: Nov. 14, 2013

(65) Prior Publication Data
US 2014/0205054 A1    Jul. 24, 2014

(30) Foreign Application Priority Data

Jan. 18, 2013 (KR) .................. 10-2013-0005989
Sep. 13, 2013 (KR) .................. 10-2013-0110624

(51) Int. Cl.
| G21C 3/20 | (2006.01) |
| G21C 21/02 | (2006.01) |
| G21C 3/04 | (2006.01) |

(52) U.S. Cl.
CPC ............... *G21C 3/20* (2013.01); *G21C 21/02* (2013.01); *G21C 3/04* (2013.01); *G21C 2003/047* (2013.01); *Y02E 30/40* (2013.01)

(58) Field of Classification Search
CPC ....... G21C 3/04; G21C 2003/047; G21C 3/20
(Continued)

(56) References Cited

U.S. PATENT DOCUMENTS

| 4,071,587 A * | 1/1978 | Eggers ................... G21C 21/02 376/414 |
| 9,299,462 B2 * | 3/2016 | Baek ......................... G21C 3/16 376/414 |
| 2009/0141851 A1 * | 6/2009 | Lee ........................... G21C 3/20 376/417 |

FOREIGN PATENT DOCUMENTS

| JP | 2939470 B | 6/1999 |
| JP | 11-202072 | 7/1999 |

(Continued)

OTHER PUBLICATIONS

Lancaster et al, "A Technique for the Selection of the Fuel Pin Diameter for a Uranium/Zirconium Alloy-Fueled Pressurized Water Reactor", Nuclear Technology, vol. 97, Jan. 1992, p. 16-26.*

(Continued)

*Primary Examiner* — Jack W Keith
*Assistant Examiner* — Daniel Wasil
(74) *Attorney, Agent, or Firm* — Fishman Stewart PLLC

(57) ABSTRACT

A nuclear fuel rod for fast reactors includes a metallic fuel slug coated with a protective coating layer. In embodiments, a nuclear fuel rod for fast reactors includes a uranium and zirconium fuel slug having a single protective coating which (Continued)

is an oxide layer having a thickness in the range of 0.5 µm to 100 µm, and the protective coating layer may be configured to (i) prevent interdiffusion between the fuel slug and a cladding tube during fast reactor operation, and (ii) prevent a cladding tube from thinning during fission operation in a fast reactor.

3 Claims, 6 Drawing Sheets

(58) Field of Classification Search
 USPC .................................. 376/414, 422; 427/5
 See application file for complete search history.

(56) References Cited

FOREIGN PATENT DOCUMENTS

| JP | 2012237574 A | 12/2012 |
|---|---|---|
| KR | 20090018396 A | 2/2009 |
| KR | 1020100081961 A | 7/2010 |
| KR | 1020100114392 A | 10/2010 |
| KR | 1011891690000 B1 | 10/2012 |
| KR | 1020120107283 A | 10/2012 |

OTHER PUBLICATIONS

R.G. Pahl, C.E. Lahm, and S.L. Hayes, Performance of HT9 clad metallic fuel at high temperature, Journal of Nuclear Materials, Sep. 2, 1993, pp. 141-147, vol. 204, Elsevier B.V.

A.B. Cohen, H. Tsai, and L.A. Neimark, Fuel/cladding compatibility in U-19Pu-10Zr/HT9-clad fuel at elevated temperatures, Journal of Nuclear Materials, Sep. 2, 1993, pp. 244-251, vol. 204, Elsevier B.V.

Takanari Ogata, Masaki Kurata, Kinya Nakamura, Akinori Itoh, and Misuo Akabori, Reactions between U-Zr alloys and Fe at 923 K, Journal of Nuclear Materials, Dec. 1997, pp. 171-175, vol. 250, Issues 2-3, Elsevier Science B.V.

English abstract of Korean patent No. KR-2009-0018396.

* cited by examiner

NUCLEAR FUEL ROD FOR FAST REACTORS INCLUDING METALLIC FUEL SLUG COATED WITH PROTECTIVE COATING LAYER AND FABRICATION METHOD THEREOF

CROSS-REFERENCES TO RELATED APPLICATION

This patent application claims the benefit of priority from Korean Patent Application No. 10-2013-0005989 filed on Jan. 18, 2013, and Korean Patent Application No. 10-2013-0110624 filed on Sep. 13, 2013, the contents of which are incorporated herein by reference.

BACKGROUND OF THE INVENTION

1. Field of the Invention

The present disclosure relates to a nuclear fuel rod for fast reactors that includes a metallic fuel slug coated with a protective coating layer and a fabrication method thereof.

2. Description of the Related Art

The present invention relates to a process for improving the performance of nuclear fuel for reactors, and more particularly, to a technique that stabilizes components of a metallic fuel slug and fission products or impurities through the stabilization of surfaces of the metallic fuel slug and metallic fuel powder by a surface treatment.

Nuclear fuel in fast reactors is designed in various types, such as a plate type, a pellet type, and a rod type, and a fissionable material that undergoes a nuclear reaction is included in a nuclear fuel rod. The fissionable material is sealed by a container, which is not reactive due to its good compatibility with a coolant and has good heat transfer characteristics, i.e. a cladding tube. The nuclear fuel rods being maintained at a constant spacing are assembled in the form of a fuel assembly and the assembly is charged into a nuclear reactor. In this case, the cladding tube surrounding the fuel must prevent chemical interactions between the fissionable material and the coolant by blocking a direct contact therebetween and must prevent the leakage of fission products. In addition, in fast reactors using metallic nuclear fuel, it is highly advantageous in terms of the safety and economic efficiency of nuclear fuel to also inhibit interactions between the cladding tube and the fissionable material.

In particular, in fast reactors using metallic fuel, a phenomenon occurs, in which a melting temperature of a metallic fuel slug decreases or the strength of a cladding tube decreases by the interpenetration between components (uranium (U), plutonium (Pu), thorium (Th), minor actinides (MA), zirconium (Zr), molybdenum (Mo), fission products, etc.) of the metallic fuel slug and components (iron (Fe), chromium (Cr), tungsten (W), Mo, vanadium (V), niobium (Nb), etc.) of the stainless steel cladding tube by diffusion. Thus, the maximum allowable burnup and the maximum allowable operating temperature of the metallic fuel for fast reactors may be limited [J. Nucl. Mater., 204 (1993) p. 244-251 and J. Nucl. Mater., 204 (1993) p. 141-147].

Also, a diffusion couple experiment performed at 923 K by T. Ogata et al. demonstrated the occurrence of a reaction due to the interdiffusion between a metallic fuel slug and a cladding tube, and reported that the thickness of an interaction layer increased proportional to the reaction time [J. Nucl. Mater., 250 (1997) p. 171-175].

In order to prevent the interdiffusion reaction, General Electric (GE) disclosed a technique for inhibiting the interaction between a metallic fuel slug and a cladding tube by inserting an about 50 µm thick liner or sleeve formed of a metal of Zr, titanium (Ti), Nb, and Mo between the metallic fuel slug and the cladding tube.

Since the technique of GE essentially requires the introduction of an additional process, the production of the nuclear fuel rod may not only be complicated, but considerable additional costs may also be required.

Also, in order to remove quartz tube mold waste generated during the preparation of a fuel slug for fast reactors and simultaneously, to inhibit a fuel-cladding chemical interaction (FCCI) between metallic fuel slug and cladding tube, D. C. Crawford et al. melt-casted an about 200 µm thick zirconium tube and reported the results of their experiments. However, cracks may occur in the zirconium tube.

Metallic fuel for reactors has been considered important as a nuclear fuel of sodium-cooled fast reactors, an advanced nuclear fuel, due to high thermal conductivity and high nuclear proliferation resistance in conjunction with pyro-processing. However, with respect to the metallic fuel, since metallic uranium as a fuel material and a fuel cladding material interdiffuse and react above 650° C., i.e., an operating temperature of the reactor, the thickness of a cladding tube decreases according to the operating time. As a result, the lifetime of the cladding tube may decrease due to the deterioration of the soundness thereof. In order to prevent the interaction phenomenon and improve the performance of the cladding material, research into using a material for preventing the interdiffusion and reaction between the fuel and the cladding tube has been conducted.

In Patent Document 1 (Korean Patent Application Laid-Open Publication No. KR-2009-0018396), a nuclear fuel rod for fast reactors, in which an oxide coating layer is formed on the inside of a cladding tube, is suggested in order to inhibit the fuel-cladding material interaction. Specifically, a concept of attaching chromium oxide, vanadium oxide, and zirconium oxide to the inside of the cladding tube by using an acid dissolution and oxidation method, a high-temperature oxidation method, an electrolytic oxidation method, and a vapor deposition method is suggested.

In Patent Document 2 (Korean Patent Application Laid-Open Publication No. KR-2010-0114392), a concept of depositing functional materials, such as titanium, nickel, chromium, vanadium, and zirconium, in multilayers is suggested in order to inhibit the fuel-cladding material interaction and improve the performance of the fuel cladding tube.

In Patent Document 3 (Korean Patent Application Laid-Open Publication No. KR-2010-0081961), a method of uniformly plating an inner wall of a fuel cladding tube and a concept of forming a nitride layer on a surface of the plating layer through an additional process of a nitridation treatment are suggested.

In Patent Document 4 (Japanese Patent Application Laid-Open Publication No. 2012-237574), a typical main body that may accommodate nuclear fuel and is formed of an iron-based material; and a cladding tube including an inner layer part composed of a carbon-based material that is formed on an inner circumferential surface of the main body and a reactor including the cladding tube are suggested in order to provide a cladding tube that may improve high-temperature characteristics and power generation efficiency, and a reactor including the cladding tube.

However, the fuel cladding tube for fast reactors is a seamless tube having a diameter of 7 mm, a thickness of 0.6 mm, and a length of 3,000 mm. Thus, there may be limitations in attaching the functional material for preventing interdiffusion to the inside of the thin and long tube, and treatment costs may be high.

Accordingly, the present inventors found that the interdiffusion between a metallic fuel slug and a cladding tube may be prevented by stabilizing components of the metallic fuel slug and fission products or impurities though the simple and uniform formation of an oxide layer, a nitride layer, or a carbide layer on the surface of the metallic fuel slug, thereby leading to completion of the present invention.

SUMMARY OF THE INVENTION

One object of the present invention is to provide a metallic fuel slug coated with a protective coating layer.

Another object of the present invention is to provide a nuclear fuel rod for fast reactors including the metallic fuel slug.

Still another object of the present invention is to provide a method of fabricating the nuclear fuel rod for fast reactors.

In order to achieve the object, the present invention provides a metallic fuel slug used in a nuclear fuel rod for fast reactors, the metallic fuel slug having a surface coated with a single protective coating layer selected from the group consisting of an oxide layer, a nitride layer, and a carbide layer, wherein the protective coating layer is formed by oxidation, nitridation, or caburization of the metallic fuel slug.

The present invention also provides a nuclear fuel rod for fast reactors including: a metallic fuel slug having a surface coated with a single protective coating layer selected from the group consisting of an oxide layer, a nitride layer, and a carbide layer, wherein the protective coating layer is formed by oxidation, nitridation, or caburization of the metallic fuel slug; and a cladding tube sealing the metal fuel slug.

Furthermore, the present invention provides a method of fabricating a nuclear fuel rod for fast reactors including: coating a surface of a metallic fuel slug with a single protective coating layer selected from the group consisting of an oxide layer, a nitride layer, and a carbide layer by oxidation, nitridation, or caburization of the metallic fuel slug (step 1); and sealing a cladding tube after introducing the metallic fuel slug coated with the protective coating layer in step 1 into the cladding tube (step 2).

The present invention also provides a method of fabricating a nuclear fuel rod for fast reactors including: coating a surface of metallic fuel powder with a single protective coating layer selected from the group consisting of an oxide layer, a nitride layer, and a carbide layer by oxidation, nitridation, or caburization of the metallic fuel powder (step 1); preparing a metallic fuel slug by forming the metallic fuel powder coated with the protective coating layer in step 1 (step 2); and sealing a cladding tube after introducing the metallic fuel slug prepared in step 2 into the cladding tube (step 3).

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
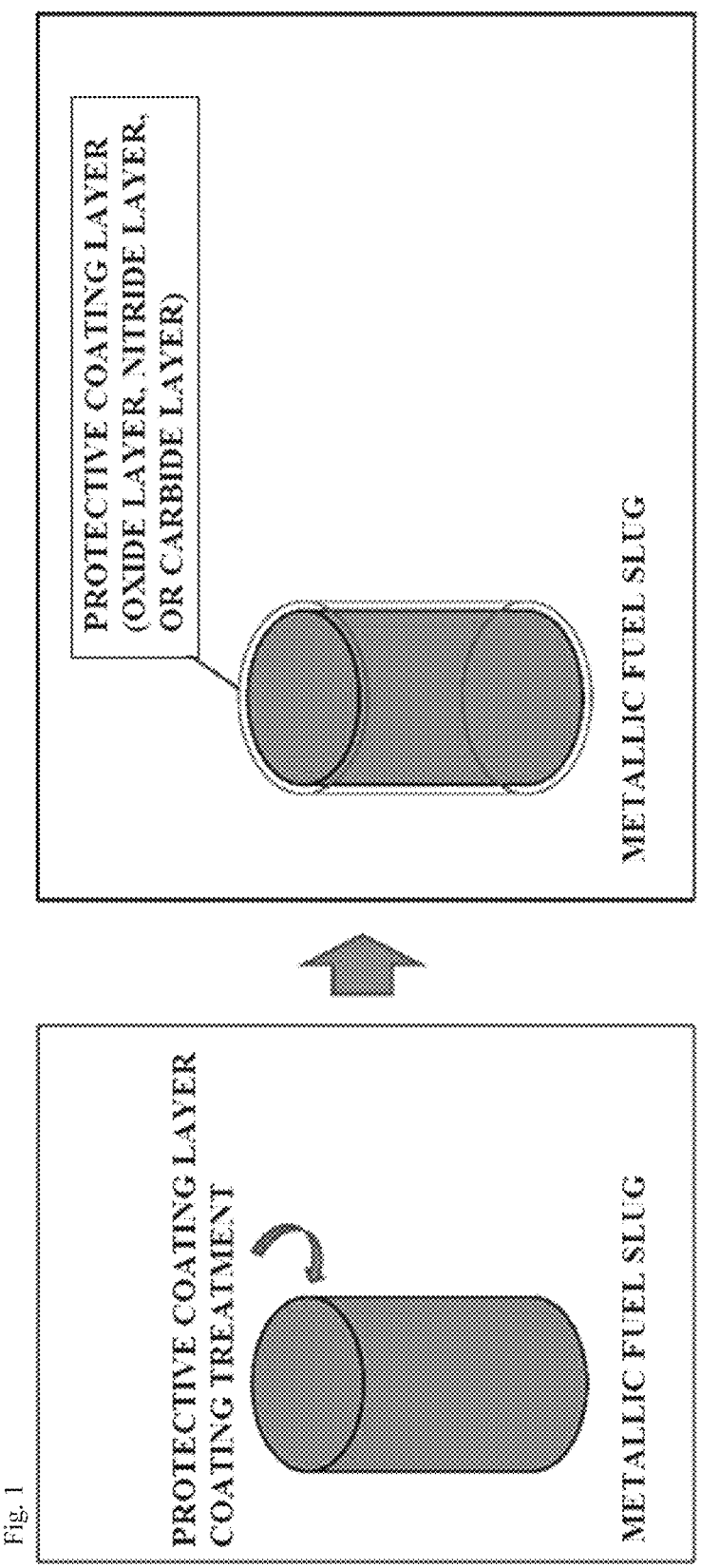
FIG. 1 is a schematic view illustrating a metallic fuel slug coated with a protective coating layer according to the present invention.

Features and advantages of the present invention will be more clearly understood by the following detailed description of the present preferred embodiments by reference to the accompanying drawings. It is first noted that terms or words used herein should be construed as meanings or concepts corresponding with the technical sprit of the present invention, based on the principle that the inventor can appropriately define the concepts of the terms to best describe his own invention. Also, it should be understood that detailed descriptions of well-known functions and structures related to the present invention will be omitted so as not to unnecessarily obscure the important point of the present invention.

Hereinafter, the present invention will be described in detail.

The present invention provides a metallic fuel slug used in a nuclear fuel rod for fast reactors, the metallic fuel slug having a surface coated with a single protective coating layer selected from the group consisting of an oxide layer, a nitride layer, and a carbide layer, wherein the protective coating layer is formed by oxidation, nitridation, or caburization of the metallic fuel slug.

In the metallic fuel slug coated with a protective coating layer according to the present invention, since components of the metallic fuel slug, fission products, or impurities are stabilized, an interdiffusion phenomenon occurred between the metallic fuel slug and the cladding tube sealing the metallic fuel slug during the fabrication of the nuclear fuel rod for fast reactors may be reduced. Also, according to the present invention, since a rare earth element, which is included on the surface of a metallic fuel fabricated by pyroprocessing to degrade the performance of the metallic fuel, may be transformed into a non-active compound, such as oxide, nitride, and carbide, the performance of the metallic fuel may be improved.

With respect to the metallic fuel slug according to the present invention, the metallic fuel slug may be fabricated by including uranium (U), plutonium (Pu), thorium (Th), minor actinides (MA, neptunium (Np), americium (Am), and curium (Cm)), rare earth elements (RE, lanthanum (La), cerium (Ce), neodymium (Nd), praseodymium (Pr), promethium (Pm), samarium (Sm), europium (Eu), and gadolinium (Gd)), zirconium (Zr), and molybdenum (Mo) alone or in a mixture thereof. However, any metallic fuel slug applicable to the nuclear fuel rod for fast reactors may be used.

With respect to the metallic fuel slug according to the present invention, a thickness of the protective coating layer may be in a range of 0.5 μm to 100 μm.

In the case that the thickness of the protective coating layer is less than 0.5 μm, the interdiffusion phenomenon may not be sufficiently inhibited. In the case in which the thickness of the protective coating layer is greater than 100 μm, since thermal conductivity may decrease due to the thick coating layer, heat discharged from the fuel may not be efficiently transferred.

The present invention also provides a nuclear fuel rod for fast reactors including a metallic fuel slug having a surface coated with a single protective coating layer selected from the group consisting of an oxide layer, a nitride layer, and a carbide layer, wherein the protective coating layer is formed by oxidation, nitridation, or caburization of the metallic fuel slug; and a cladding tube sealing the metal fuel slug.

With respect to the nuclear fuel rod for fast reactors according to the present invention, the metallic fuel slug may be fabricated by including U, Pu, Th, MA (Np, Am, and Cm), RE (La, Ce, Nd, Pr, Pm, Sm, Eu, and Gd), Zr, and Mo alone or in a mixture thereof. However, any metallic fuel slug applicable to the nuclear fuel rod for fast reactors may be used.

With respect to the nuclear fuel rod for fast reactors according to the present invention, a thickness of the protective coating layer may be in a range of 0.5 μm to 100 μm.

In the case that the thickness of the protective coating layer is less than 0.5 μm, the interdiffusion phenomenon may not be sufficiently inhibited. In the case in which the thickness of the protective coating layer is greater than 100 μm, since thermal conductivity may decrease due to the thick coating layer, heat discharged from the fuel may not be efficiently transferred.

With respect to the nuclear fuel rod for fast reactors according to the present invention, the cladding tube may include iron (Fe), chromium (Cr), tungsten (W), Mo, vanadium (V), titanium (Ti), niobium (Nb), tantalum (Ta), silicon (Si), manganese (Mn), nickel (Ni), carbon (C), nitrogen (N), and boron (B) alone or in the form of an alloy by mixing thereof. However, the present invention is not limited thereto.

Furthermore, the present invention provides a method of fabricating a nuclear fuel rod for fast reactors including: coating a surface of a metallic fuel slug with a single protective coating layer selected from the group consisting of an oxide layer, a nitride layer, and a carbide layer by oxidation, nitridation, or caburization of the metallic fuel slug (step 1); and sealing a cladding tube after introducing the metallic fuel slug coated with the protective coating layer in step 1 into the cladding tube (step 2).

In the fabricating method according to the present invention, step 1 is a step of forming the protective coating layer on the surface of the metallic fuel slug. Specifically, an oxide, nitride, or carbide coating layer may be formed on the surface of the metallic fuel slug by oxidation, nitridation, or caburization of the metallic fuel slug.

In the fabricating method according to the present invention, step 2 is a step of sealing the cladding tube after introducing the surface-treated metallic fuel slug into the cladding tube.

Formation of Oxide Protective Coating Layer

A method of heat treating in a gas atmosphere containing oxygen, a method of dipping in an oxidation solution, and a method of performing an electrolytic treatment may be used as a method of forming an oxide protective coating layer.

First, the method of heat treating in a gas atmosphere containing oxygen may be performed by heat treating a metallic fuel slug at a temperature ranging from 100° C. to 1000° C. and a pressure ranging from 1 atm to 50 atm in an atmosphere of oxygen, air, or inert gas containing oxygen.

In the case that the heat treatment temperature is less than 100° C., the oxide layer may not be efficiently formed. In the case in which the heat treatment temperature is greater than 1000° C., transformation of the metallic fuel slug may occur and thus, the performance of the metallic fuel slug as a fuel may be degraded. Also, a pressurization treatment may be performed for the efficient heat treatment. In the case that the pressure of the heat treatment is 50 atm or more, an additional sealing apparatus may be required, and thus, economic efficiency of the process may be reduced.

Next, the method of dipping in an oxidation solution may be performed by dipping a metallic fuel slug in a hydrochloric, sulfuric, nitric, sodium hydroxide, or potassium hydroxide solution, and heat treating the metallic fuel slug at a temperature ranging from 30° C. to 90° C. for 30 minutes to 5 hours.

Finally, the method of performing an electrolytic treatment may be performed by plasma electrolytic oxidation, micro-arc oxidation, micro-arc discharge oxidation, spark anodizing, anodic spark deposition, micro-arc anodizing, micro plasma anodizing, micro plasma oxidation, and electro plasma oxidation of a metallic fuel slug.

Formation of Nitride Protective Coating Layer

A method of heat treating in a gas atmosphere containing nitrogen and an ion nitriding method may be used as a method of forming a nitride protective coating layer.

First, the method of heat treating in a gas atmosphere containing nitrogen may be performed by heat treating a metallic fuel slug at a temperature ranging from 100° C. to 1000° C. and a pressure ranging from 1 atm to 50 atm in an atmosphere of nitrogen, ammonia, or inert gas containing nitrogen.

In the case that the heat treatment temperature is less than 100° C., the nitride layer may not be efficiently formed. In the case in which the heat treatment temperature is greater than 1000° C., transformation of the metallic fuel slug may occur and thus, the performance of the metallic fuel slug as a fuel may be degraded. Also, a pressurization treatment may be performed for the efficient heat treatment. In the case that the pressure of the heat treatment is 50 atm or more, an additional sealing apparatus may be required, and thus, economic efficiency of the process may be reduced.

Next, the ion nitriding method may be performed by using a method of applying a negative potential to an object to be ion-nitrided in a gas atmosphere containing nitrogen. The ion nitriding method may be completed by heat treating the object under conditions of a temperature ranging from 100° C. to 1000° C., a pressure ranging from 1 atm to 50 atm, and a potential ranging from 1 V to 1,000 V in an inert atmosphere containing nitrogen. In the case that the heat treatment temperature is less than 100° C., the nitride layer may not be efficiently formed. In the case in which the heat treatment temperature is greater than 1000° C., transformation of the metallic fuel slug may occur and thus, the performance of the metallic fuel slug as a fuel may be degraded. Also, a pressurization treatment may be performed for the efficient heat treatment. In the case that the pressure of the heat treatment is 50 atm or more, an additional sealing apparatus may be required, and thus, economic efficiency of the process may be reduced. With respect to the applied potential, efficient ion nitridation may not be achieved at a potential of less than 1 V. Since an additional insulation treatment may be required at a potential of greater than 1,000 V, economic efficiency of the process may be reduced.

Formation of Carbide Protective Coating Layer

A method of heat treating in a gas atmosphere containing carbon may be used as a method of forming a carbide protective coating layer.

The method of heat treating in a gas atmosphere containing carbon may be performed by heat treating a metallic fuel slug at a temperature ranging from 100° C. to 1000° C. and a pressure ranging from 1 atm to 50 atm in an atmosphere of carbon, methane, carbon dioxide, or carbon monoxide.

In the case that the heat treatment temperature is less than 100° C., the carbide layer may not be efficiently formed. In the case in which the heat treatment temperature is greater than 1000° C., transformation of the metallic fuel slug may occur and thus, the performance of the metallic fuel slug as a fuel may be degraded. Also, a pressurization treatment may be performed for the efficient heat treatment. In the case that the pressure of the heat treatment is 50 atm or more, an additional sealing apparatus may be required, and thus, economic efficiency of the process may be reduced.

Also, the present invention provides a method of fabricating a nuclear fuel rod for fast reactors including: coating a surface of metallic fuel powder with a single protective coating layer selected from the group consisting of an oxide layer, a nitride layer, and a carbide layer by oxidation, nitridation, or caburization of the metallic fuel powder (step 1); preparing a metallic fuel slug by forming the metallic fuel powder coated with the protective coating layer in step 1 (step 2); and sealing a cladding tube after introducing the metallic fuel slug prepared in step 2 into the cladding tube (step 3).

Since the method of fabricating a nuclear fuel rod for fast reactors according to the present invention may form the protective coating layer on the surface of the metallic fuel powder, components of fuel, fission products, or impurities may be stabilized and various types of fuels may be fabricated. In particular, the coated metallic fuel powder may be formed in the form of a metallic fuel slug during the fabrication of the nuclear fuel rod for fast reactors and thus, the interdiffusion phenomenon between the metallic fuel slug and the cladding tube sealing the metallic fuel slug may be reduced.

In the fabricating method according to the present invention, step 1 is a step of forming the protective coating layer on the surface of the metallic fuel powder. Specifically, an oxide, nitride, or carbide coating layer may be formed on the surface of the metallic fuel powder by oxidation, nitridation, or caburization of the metallic fuel powder. Preferred conditions that may form the protective layers are as described in the above specification.

In the fabricating method according to the present invention, step 2 is a step of preparing the metallic fuel slug by forming the metallic fuel powder. Specifically, a method of stacking the powder in a nuclear fuel rod composed of a cylindrical cladding tube, a method of sintering the powder by heat treating in a heat treatment furnace, and a method of forming a cylindrical sintered body by introducing the metallic fuel powder into a metal or ceramic matrix and heat treating.

In the fabricating method according to the present invention, step 3 is a step of sealing the cladding tube after introducing the metallic fuel slug into the cladding tube.

As described above, the nuclear fuel rod for fast reactors that includes the surface treated metallic fuel slug and the cladding tube according to the present invention has an excellent effect of stabilizing components of the metallic fuel slug and fission products or impurities, because the interdiffusion between the metallic fuel slug and the cladding tube does not occur. Also, since the uniform coating on the surface of the metallic fuel slug may be facilitated and fabrication costs may be significantly reduced in comparison to a typical technique of using a functional material for preventing the interdiffusion at an inner surface of the cladding tube, it may be suitable for fabricating the nuclear fuel rod for fast reactors.

Hereinafter, the present invention will be described in more detail according to examples. However, the following examples are provided for illustrative purposes only, and the scope of the present invention should not be limited thereto in any manner.

Example 1

Fabrication 1 of Nuclear Fuel Rod for Fast Reactors Having Oxide Layer Formed on Surface An oxide layer was formed on a surface of a metallic fuel slug by heat treating the metallic fuel slug formed of U-10Zr, a nuclear fuel material, at a temperature of 600° C. and a pressure of 5 atm for 2 hours in an argon gas atmosphere containing 20% oxygen. Then, the heat-treated metallic fuel slug was put into a HT9 (12Cr-1Mo) cladding tube to fabricate a nuclear fuel rod for fast reactors.

Example 2

Fabrication 2 of Nuclear Fuel Rod for Fast Reactors Having Oxide Layer Formed on Surface An oxide layer was formed on a surface of a metallic fuel slug by heat treating the metallic fuel slug formed of U-10Zr, a nuclear fuel material, at a temperature of 150° C. and a pressure of 1 atm for 1 hour in an air atmosphere. Then, the heat-treated metallic fuel slug was put into a HT9 (12Cr-1Mo) cladding tube to fabricate a nuclear fuel rod for fast reactors.

Example 3

Fabrication 3 of Nuclear Fuel Rod for Fast Reactors Having Oxide Layer Formed on Surface An oxide layer was formed on a surface of a metallic fuel slug by heat treating the metallic fuel slug formed of U-10Zr, a nuclear fuel material, at a temperature of 300° C. and a pressure of 1 atm for 1 hour in an air atmosphere. Then, the heat-treated metallic fuel slug was put into a HT9 (12Cr-1Mo) cladding tube to fabricate a nuclear fuel rod for fast reactors.

Example 4

Fabrication 4 of Nuclear Fuel Rod for Fast Reactors Having Oxide Layer Formed on Surface An oxide layer was formed on a surface of a metallic fuel slug by dipping the metallic fuel slug formed of U-10Zr, a nuclear fuel material, in a hydrochloric acid solution at 50° C. for 2 hours. Then, the metallic fuel slug was put into a HT9 (12Cr-1Mo) cladding tube to fabricate a nuclear fuel rod for fast reactors.

Example 5

Fabrication 5 of Nuclear Fuel Rod for Fast Reactors Having Oxide Layer Formed on Surface An oxide layer was formed on a surface of a metallic fuel slug by dipping the metallic fuel slug formed of U-10Zr, a nuclear fuel material, in a sulfuric acid solution at 50° C. for 2 hours. Then, the metallic fuel slug was put into a HT9 (12Cr-1Mo) cladding tube to fabricate a nuclear fuel rod for fast reactors.

Example 6

Fabrication 6 of Nuclear Fuel Rod for Fast Reactors Having Oxide Layer Formed on Surface An oxide layer was formed on a surface of a metallic fuel slug by dipping the metallic fuel slug formed of U-10Zr, a nuclear fuel material, in a nitric acid solution at 50° C. for 2 hours. Then, the metallic fuel slug was put into a HT9 (12Cr-1Mo) cladding tube to fabricate a nuclear fuel rod for fast reactors.

Example 7

Fabrication 7 of Nuclear Fuel Rod for Fast Reactors Having Oxide Layer Formed on Surface An oxide layer was formed on a surface of a metallic fuel slug by dipping the metallic fuel slug formed of U-10Zr, a nuclear fuel material, in a sodium hydroxide solution at 50° C. for 2 hours. Then, the metallic fuel slug was put into a HT9 (12Cr-1Mo) cladding tube to fabricate a nuclear fuel rod for fast reactors.

Example 8

Fabrication 8 of Nuclear Fuel Rod for Fast Reactors Having Oxide Layer Formed on Surface An oxide layer was formed on a surface of a metallic fuel slug by dipping the metallic fuel slug formed of U-10Zr, a nuclear fuel material, in a potassium hydroxide solution at 50° C. for 2 hours. Then, the metallic fuel slug was put into a HT9 (12Cr-1Mo) cladding tube to fabricate a nuclear fuel rod for fast reactors.

Example 9

Fabrication 9 of Nuclear Fuel Rod for Fast Reactors Having Oxide Layer Formed on Surface An oxide layer was formed on a surface of a metallic fuel slug through plasma electrolytic oxidation by dipping the metallic fuel slug formed of U-10Zr, a nuclear fuel material, in a potassium hydroxide solution and a sodium hydroxide solution, and then applying a positive voltage of 200 V thereto. Then, the metallic fuel slug was put into a HT9 (12Cr-1Mo) cladding tube to fabricate a nuclear fuel rod for fast reactors.

Example 10

Fabrication 10 of Nuclear Fuel Rod for Fast Reactors Having Oxide Layer Formed on Surface An oxide layer was formed on a surface of a metallic fuel slug by micro-arc oxidation of the metallic fuel slug formed of U-10Zr, a nuclear fuel material. Then, the metallic fuel slug was put into a HT9 (12Cr-1Mo) cladding tube to fabricate a nuclear fuel rod for fast reactors.

Example 11

Fabrication 11 of Nuclear Fuel Rod for Fast Reactors Having Oxide Layer Formed on Surface An oxide layer was formed on a surface of a metallic fuel slug by micro-arc discharge oxidation of the metallic fuel slug formed of U-10Zr, a nuclear fuel material. Then, the metallic fuel slug was put into a HT9 (12Cr-1Mo) cladding tube to fabricate a nuclear fuel rod for fast reactors.

Example 12

Fabrication 12 of Nuclear Fuel Rod for Fast Reactors Having Oxide Layer Formed on Surface An oxide layer was formed on a surface of a metallic fuel slug by spark anodizing of the metallic fuel slug formed of U-10Zr, a nuclear fuel material. Then, the metallic fuel slug was put into a HT9 (12Cr-1Mo) cladding tube to fabricate a nuclear fuel rod for fast reactors.

Example 13

Fabrication 13 of Nuclear Fuel Rod for Fast Reactors Having Oxide Layer Formed on Surface An oxide layer was formed on a surface of a metallic fuel slug by anodic spark deposition of the metallic fuel slug formed of U-10Zr, a nuclear fuel material. Then, the metallic fuel slug was put into a HT9 (12Cr-1Mo) cladding tube to fabricate a nuclear fuel rod for fast reactors.

Example 14

Fabrication 14 of Nuclear Fuel Rod for Fast Reactors Having Oxide Layer Formed on Surface An oxide layer was formed on a surface of a metallic fuel slug by micro-arc anodizing of the metallic fuel slug formed of U-10Zr, a nuclear fuel material. Then, the metallic fuel slug was put into a HT9 (12Cr-1Mo) cladding tube to fabricate a nuclear fuel rod for fast reactors.

Example 15

Fabrication 15 of Nuclear Fuel Rod for Fast Reactors Having Oxide Layer Formed on Surface An oxide layer was formed on a surface of a metallic fuel slug by micro plasma anodizing of the metallic fuel slug formed of U-10Zr, a nuclear fuel material. Then, the metallic fuel slug was put into a HT9 (12Cr-1Mo) cladding tube to fabricate a nuclear fuel rod for fast reactors.

Example 16

Fabrication 16 of Nuclear Fuel Rod for Fast Reactors Having Oxide Layer Formed on Surface An oxide layer was formed on a surface of a metallic fuel slug by micro plasma oxidation of the metallic fuel slug formed of U-10Zr, a nuclear fuel material. Then, the metallic fuel slug was put into a HT9 (12Cr-1Mo) cladding tube to fabricate a nuclear fuel rod for fast reactors.

Example 17

Fabrication 17 of Nuclear Fuel Rod for Fast Reactors Having Oxide Layer Formed on Surface An oxide layer was formed on a surface of a metallic fuel slug by electro plasma oxidation of the metallic fuel slug formed of U-10Zr, a nuclear fuel material. Then, the metallic fuel slug was put into a HT9 (12Cr-1Mo) cladding tube to fabricate a nuclear fuel rod for fast reactors.

Example 18

Fabrication 1 of Nuclear Fuel Rod for Fast Reactors Having Nitride Layer Formed on Surface A nitride layer was formed on a surface of a metallic fuel slug by heat treating the metallic fuel slug formed of U-10Zr, a nuclear fuel material, at a temperature of 800° C. and a pressure of 2 atm for 2 hours in a 100% pure ammonia gas atmosphere. Then, the heat-treated metallic fuel slug was put into a HT9 (12Cr-1Mo) cladding tube to fabricate a nuclear fuel rod for fast reactors.

Example 19

Fabrication 2 of Nuclear Fuel Rod for Fast Reactors Having Nitride Layer Formed on Surface A nitride layer was formed on a surface of a metallic fuel slug by heat treating the metallic fuel slug formed of U-10Zr, a nuclear fuel material, at a temperature of 500° C. and a pressure of 2 atm for 2 hours in a 100% pure ammonia gas atmosphere. Then, the heat-treated metallic fuel slug was put into a HT9 (12Cr-1Mo) cladding tube to fabricate a nuclear fuel rod for fast reactors.

Example 20

Fabrication 3 of Nuclear Fuel Rod for Fast Reactors Having Nitride Layer Formed on Surface A nitride layer was formed on a surface of a metallic fuel slug by heat treating the metallic fuel slug formed of U-10Zr, a nuclear fuel material, at a temperature of 300° C. and a pressure of 2 atm for 2 hours in a 100% pure ammonia gas atmosphere. Then, the heat-treated metallic fuel slug was put into a HT9 (12Cr-1Mo) cladding tube to fabricate a nuclear fuel rod for fast reactors.

Example 21

Fabrication 4 of Nuclear Fuel Rod for Fast Reactors Having Nitride Layer Formed on Surface A nitride layer was formed on a surface of a metallic fuel slug by heat treating the metallic fuel slug formed of U-10Zr, a nuclear fuel material, at a temperature of 150° C. and a pressure of 2 atm for 2 hours in a 100% pure ammonia gas atmosphere. Then, the heat-treated metallic fuel slug was put into a HT9 (12Cr-1Mo) cladding tube to fabricate a nuclear fuel rod for fast reactors.

Example 22

Fabrication 5 of Nuclear Fuel Rod for Fast Reactors Having Nitride Layer Formed on Surface An ion-nitrided layer was formed on a surface of a metallic fuel slug by introducing the metallic fuel slug formed of U-10Zr, a nuclear fuel material, into a mixed gas containing 80% nitrogen and 20% argon gas, and heat treating the metallic fuel slug at a temperature of 800° C. and a negative voltage of 200 V for 2 hours. Then, the metallic fuel slug was put into a HT9 (12Cr-1Mo) cladding tube to fabricate a nuclear fuel rod for fast reactors.

Example 23

Fabrication 6 of Nuclear Fuel Rod for Fast Reactors Having Nitride Layer Formed on Surface An ion-nitrided layer was formed on a surface of a metallic fuel slug by introducing the metallic fuel slug formed of U-10Zr, a nuclear fuel material, into a mixed gas containing 80% nitrogen and 20% argon gas, and heat treating the metallic fuel slug at a temperature of 500° C. and a negative voltage of 200 V for 2 hours. Then, the metallic fuel slug was put into a HT9 (12Cr-1Mo) cladding tube to fabricate a nuclear fuel rod for fast reactors.

Example 24

Fabrication 7 of Nuclear Fuel Rod for Fast Reactors Having Nitride Layer Formed on Surface An ion-nitrided layer was formed on a surface of a metallic fuel slug by introducing the metallic fuel slug formed of U-10Zr, a nuclear fuel material, into a mixed gas containing 80% nitrogen and 20% argon gas, and heat treating the metallic fuel slug at a temperature of 300° C. and a negative voltage of 200 V for 2 hours. Then, the metallic fuel slug was put into a HT9 (12Cr-1Mo) cladding tube to fabricate a nuclear fuel rod for fast reactors.

Example 25

Fabrication 8 of Nuclear Fuel Rod for Fast Reactors Having Nitride Layer Formed on Surface An ion-nitrided layer was formed on a surface of a metallic fuel slug by introducing the metallic fuel slug formed of U-10Zr, a nuclear fuel material, into a mixed gas containing 80% nitrogen and 20% argon gas, and heat treating the metallic fuel slug at a temperature of 150° C. and a negative voltage of 200 V for 2 hours. Then, the metallic fuel slug was put into a HT9 (12Cr-1Mo) cladding tube to fabricate a nuclear fuel rod for fast reactors.

Example 26

Fabrication 1 of Nuclear Fuel Rod for Fast Reactors Having Carbide Layer Formed on Surface A carbide layer was formed on a surface of a metallic fuel slug by introducing the metallic fuel slug formed of U-10Zr, a nuclear fuel material, into carbon powder and heat treating the metallic fuel slug at a temperature of 700° C. and a pressure of 1 atm for 2 hours. Then, the heat-treated metallic fuel slug was put into a HT9 (12Cr-1Mo) cladding tube to fabricate a nuclear fuel rod for fast reactors.

Example 27

Fabrication 2 of Nuclear Fuel Rod for Fast Reactors Having Carbide Layer Formed on Surface A carbide layer was formed on a surface of a metallic fuel slug by introducing the metallic fuel slug formed of U-10Zr, a nuclear fuel material, into carbon powder and heat treating the metallic fuel slug at a temperature of 500° C. and a pressure of 1 atm for 2 hours. Then, the heat-treated metallic fuel slug was put into a HT9 (12Cr-1Mo) cladding tube to fabricate a nuclear fuel rod for fast reactors.

Example 28

Fabrication 3 of Nuclear Fuel Rod for Fast Reactors Having Carbide Layer Formed on Surface A carbide layer was formed on a surface of a metallic fuel slug by introducing the metallic fuel slug formed of U-10Zr, a nuclear fuel material, into carbon powder and heat treating the metallic fuel slug at a temperature of 300° C. and a pressure of 1 atm for 2 hours. Then, the heat-treated metallic fuel slug was put into a HT9 (12Cr-1Mo) cladding tube to fabricate a nuclear fuel rod for fast reactors.

Example 29

Fabrication 4 of Nuclear Fuel Rod for Fast Reactors Having Carbide Layer Formed on Surface A carbide layer was formed on a surface of a metallic fuel slug by introducing the metallic fuel slug formed of U-10Zr, a nuclear fuel material, into carbon powder and heat treating the metallic fuel slug at a temperature of 150° C. and a pressure of 1 atm for 2 hours. Then, the heat-treated metallic fuel slug was put into a HT9 (12Cr-1Mo) cladding tube to fabricate a nuclear fuel rod for fast reactors.

Example 30

Fabrication 5 of Nuclear Fuel Rod for Fast Reactors Having Carbide Layer Formed on Surface A carbide layer was formed on a surface of a metallic fuel slug by heat treating the metallic fuel slug formed of U-10Zr, a nuclear fuel material, at a temperature of 700° C. and a pressure of 1 atm for 2 hours in a methane gas atmosphere. Then, the heat-treated metallic fuel slug was put into a HT9 (12Cr-1Mo) cladding tube to fabricate a nuclear fuel rod for fast reactors.

Example 3

Fabrication 6 of Nuclear Fuel Rod for Fast Reactors Having Carbide Layer Formed on Surface A carbide layer was formed on a surface of a metallic fuel slug by heat treating the metallic fuel slug formed of U-10Zr, a nuclear fuel material, at a temperature of 500° C. and a pressure of 1 atm for 2 hours in a methane gas atmosphere. Then, the heat-treated metallic fuel slug was put into a HT9 (12Cr-1Mo) cladding tube to fabricate a nuclear fuel rod for fast reactors.

Example 32

Fabrication 7 of Nuclear Fuel Rod for Fast Reactors Having Carbide Layer Formed on Surface A carbide layer was formed on a surface of a metallic fuel slug by heat treating the metallic fuel slug formed of U-10Zr, a nuclear fuel material, at a temperature of 300° C. and a pressure of 1 atm for 2 hours in a methane gas atmosphere. Then, the heat-treated metallic fuel slug was put into a HT9 (12Cr-1Mo) cladding tube to fabricate a nuclear fuel rod for fast reactors.

Example 33

Fabrication 8 of Nuclear Fuel Rod for Fast Reactors Having Carbide Layer Formed on Surface A carbide layer was formed on a surface of a metallic fuel slug by heat treating the metallic fuel slug formed of U-10Zr, a nuclear fuel material, at a temperature of 150° C. and a pressure of 1 atm for 2 hours in a methane gas atmosphere. Then, the heat-treated metallic fuel slug was put into a HT9 (12Cr-1Mo) cladding tube to fabricate a nuclear fuel rod for fast reactors.

Example 34

Fabrication 9 of Nuclear Fuel Rod for Fast Reactors Having Carbide Layer Formed on Surface A carbide layer was formed on a surface of a metallic fuel slug by heat treating the metallic fuel slug formed of U-10Zr, a nuclear fuel material, at a temperature of 700° C. and a pressure of 1 atm for 2 hours in a carbon dioxide gas atmosphere. Then, the heat-treated metallic fuel slug was put into a HT9 (12Cr-1Mo) cladding tube to fabricate a nuclear fuel rod for fast reactors.

Example 35

Fabrication 10 of Nuclear Fuel Rod for Fast Reactors Having Carbide Layer Formed on Surface A carbide layer was formed on a surface of a metallic fuel slug by heat treating the metallic fuel slug formed of U-10Zr, a nuclear fuel material, at a temperature of 500° C. and a pressure of 1 atm for 2 hours in a carbon dioxide gas atmosphere. Then, the heat-treated metallic fuel slug was put into a HT9 (12Cr-1Mo) cladding tube to fabricate a nuclear fuel rod for fast reactors.

Example 36

Fabrication 11 of Nuclear Fuel Rod for Fast Reactors Having Carbide Layer Formed on Surface A carbide layer was formed on a surface of a metallic fuel slug by heat treating the metallic fuel slug formed of U-10Zr, a nuclear fuel material, at a temperature of 300° C. and a pressure of 1 atm for 2 hours in a carbon dioxide gas atmosphere. Then, the heat-treated metallic fuel slug was put into a HT9 (12Cr-1Mo) cladding tube to fabricate a nuclear fuel rod for fast reactors.

Example 37

Fabrication 12 of Nuclear Fuel Rod for Fast Reactors Having Carbide Layer Formed on Surface A carbide layer was formed on a surface of a metallic fuel slug by heat treating the metallic fuel slug formed of U-10Zr, a nuclear fuel material, at a temperature of 150° C. and a pressure of 1 atm for 2 hours in a carbon dioxide gas atmosphere. Then, the heat-treated metallic fuel slug was put into a HT9 (12Cr-1Mo) cladding tube to fabricate a nuclear fuel rod for fast reactors.

Example 38

Fabrication 13 of Nuclear Fuel Rod for Fast Reactors Having Carbide Layer Formed on Surface A carbide layer was formed on a surface of a metallic fuel slug by heat treating the metallic fuel slug formed of U-10Zr, a nuclear fuel material, at a temperature of 700° C. and a pressure of 1 atm for 2 hours in a carbon monoxide gas atmosphere. Then, the heat-treated metallic fuel slug was put into a HT9 (12Cr-1Mo) cladding tube to fabricate a nuclear fuel rod for fast reactors.

Example 39

Fabrication 14 of Nuclear Fuel Rod for Fast Reactors Having Carbide Layer Formed on Surface A carbide layer was formed on a surface of a metallic fuel slug by heat treating the metallic fuel slug formed of U-10Zr, a nuclear fuel material, at a temperature of 500° C. and a pressure of 1 atm for 2 hours in a carbon monoxide gas atmosphere. Then, the heat-treated metallic fuel slug was put into a HT9 (12Cr-1Mo) cladding tube to fabricate a nuclear fuel rod for fast reactors.

Example 40

Fabrication 15 of Nuclear Fuel Rod for Fast Reactors Having Carbide Layer Formed on Surface A carbide layer was formed on a surface of a metallic fuel slug by heat treating the metallic fuel slug formed of U-10Zr, a nuclear fuel material, at a temperature of 300° C. and a pressure of 1 atm for 2 hours in a carbon monoxide gas atmosphere. Then, the heat-treated metallic fuel slug was put into a HT9 (12Cr-1Mo) cladding tube to fabricate a nuclear fuel rod for fast reactors.

Example 41

Fabrication 16 of Nuclear Fuel Rod for Fast Reactors Having Carbide Layer Formed on Surface A carbide layer was formed on a surface of a metallic fuel slug by heat treating the metallic fuel slug formed of U-10Zr, a nuclear fuel material, at a temperature of 150° C. and a pressure of 1 atm for 2 hours in a carbon monoxide gas atmosphere. Then, the heat-treated metallic fuel slug was put into a HT9 (12Cr-1Mo) cladding tube to fabricate a nuclear fuel rod for fast reactors.

Comparative Example 1

Fabrication of Nuclear Fuel Rod for Fast Reactors with No Surface Treatment

A surface treatment was not performed on a metallic fuel slug formed of U-10Zr, a nuclear fuel material, and the metallic fuel slug was put into a HT9 (12Cr-1Mo) cladding tube to fabricate a nuclear fuel rod for fast reactors.

Experimental Example 1

Metallic Fuel Slug-Cladding Tube Diffusion Couple Experiment

The following experiments were performed for evaluating the interdiffusivity between the metallic fuel slug and the cladding tube in the nuclear fuel rods for fast reactors fabricated in examples.

Specifically, the nuclear fuel rods for fast reactors fabricated in Examples 1, 2, 3, and 18, and Comparative Example 1 were cut to a length of 10 mm, and the 10 mm long nuclear fuel rods were then cut in half in a radial direction. Then, metallic fuel slug-cladding tube diffusion couple experiments were performed at 800° C. for 25 hours. After the diffusion couple experiments, bonded samples were cooled and cross sections of the bonded samples were observed using a scanning electron microscope. The results thereof are presented in FIGS. 2 to 6.

Figure 2:
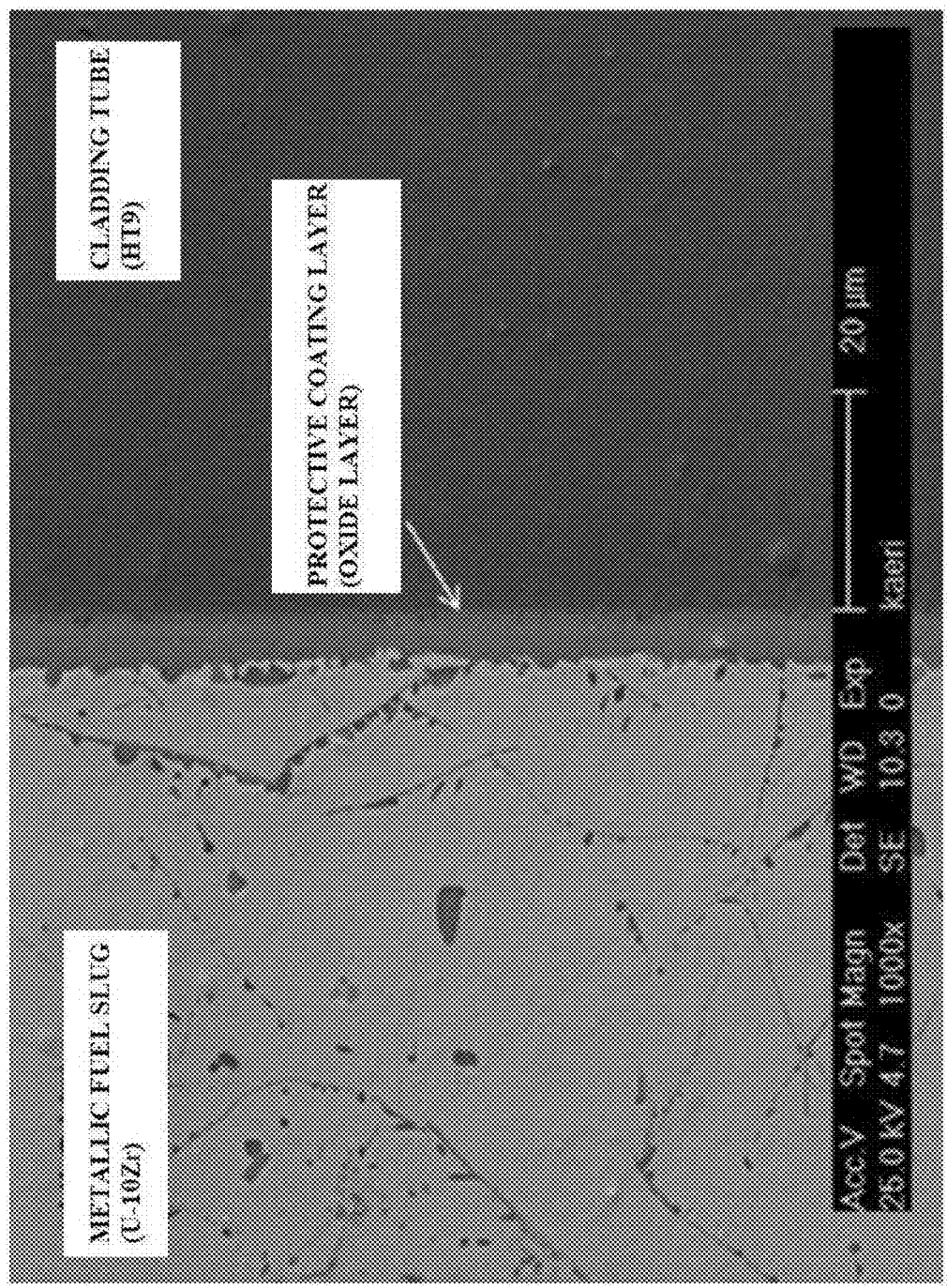
FIG. 2 is a scanning electron microscope image of a cross section of a nuclear fuel rod for fast reactors according to Example 1 of the present invention after a diffusion couple experiment.

FIG. 2 is a scanning electron microscope image of the cross section of the nuclear fuel rod for fast reactors according to Example 1 of the present invention after the diffusion couple experiment.

Figure 3:
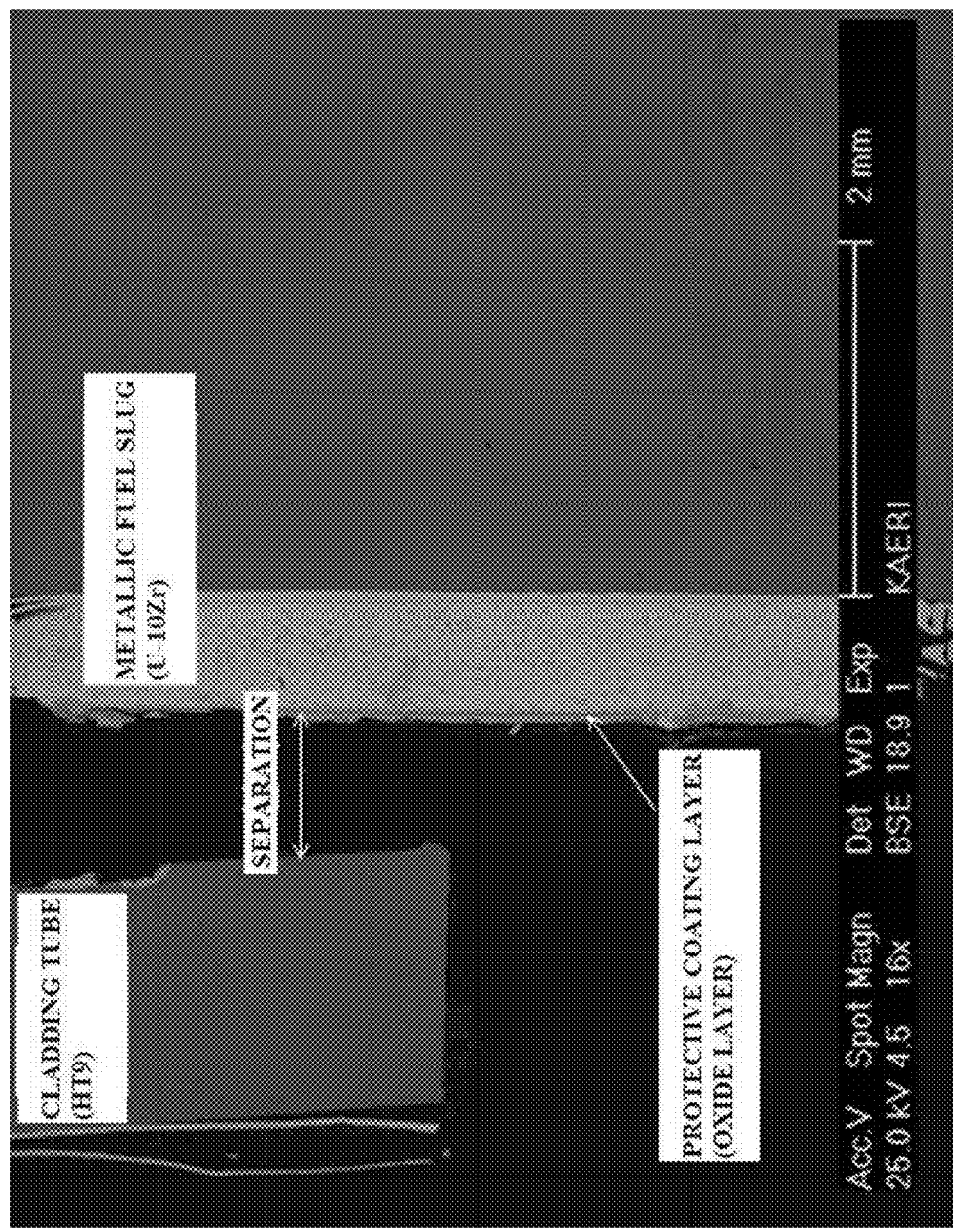
FIG. 3 is a scanning electron microscope image of a cross section of a nuclear fuel rod for fast reactors according to Example 2 of the present invention after a diffusion couple experiment.

FIG. 3 is a scanning electron microscope image of the cross section of the nuclear fuel rod for fast reactors according to Example 2 of the present invention after the diffusion couple experiment.

Figure 4:
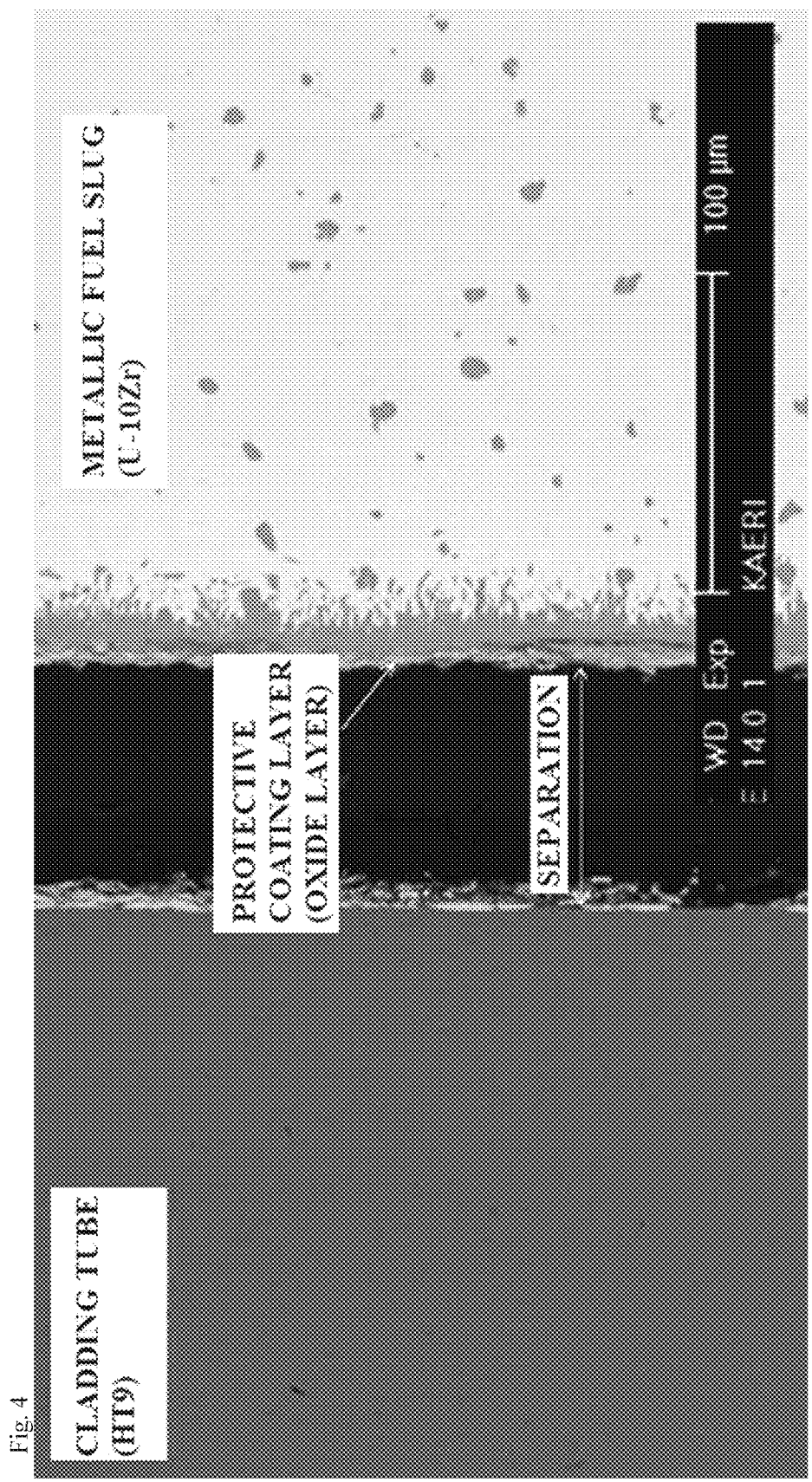
FIG. 4 is a scanning electron microscope image of a cross section of a nuclear fuel rod for fast reactors according to Example 3 of the present invention after a diffusion couple experiment.

FIG. 4 is a scanning electron microscope image of the cross section of the nuclear fuel rod for fast reactors according to Example 3 of the present invention after the diffusion couple experiment.

Figure 5:
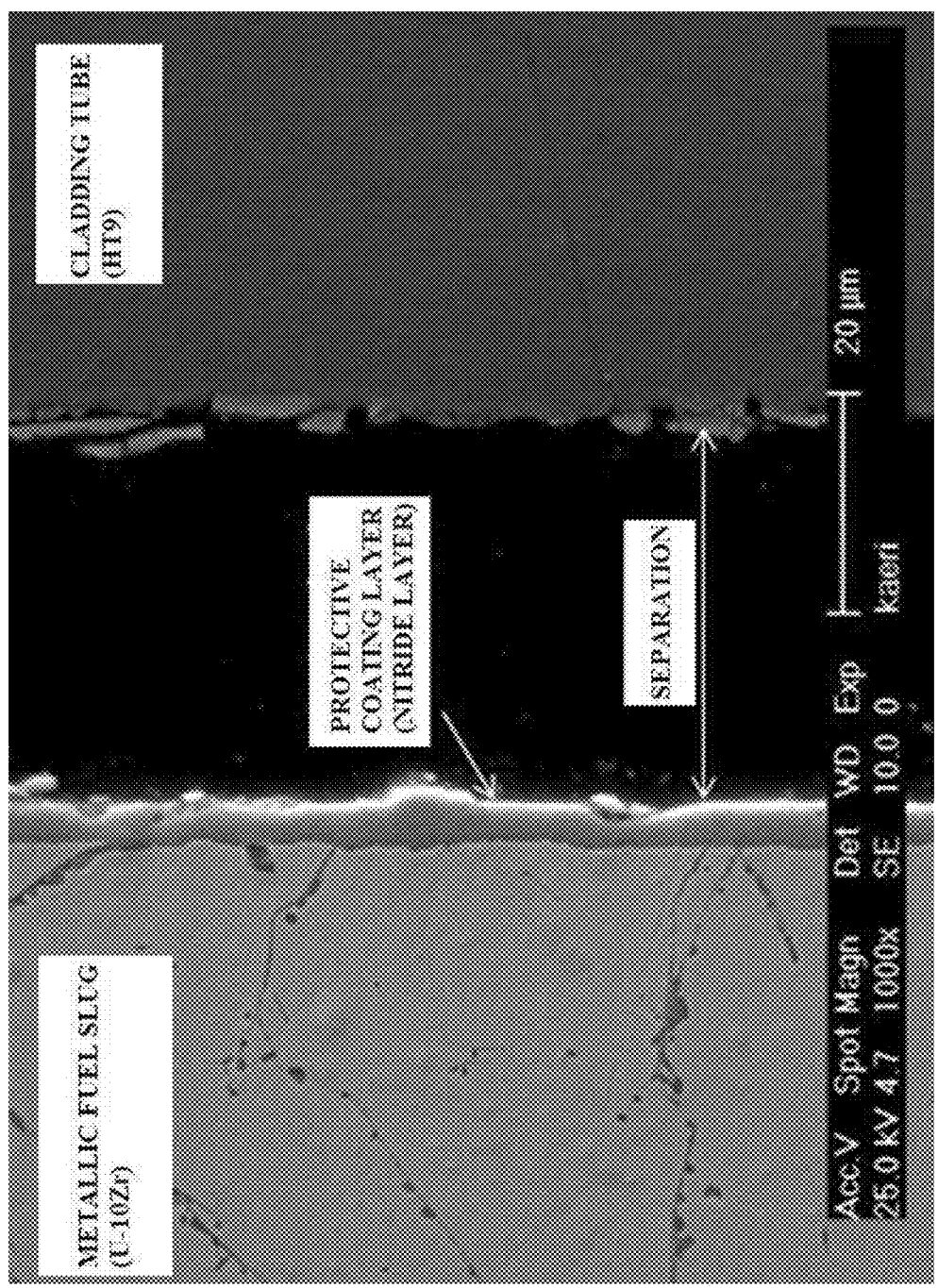
FIG. 5 is a scanning electron microscope image of a cross section of a nuclear fuel rod for fast reactors according to Example 18 of the present invention after a diffusion couple experiment.

FIG. 5 is a scanning electron microscope image of the cross section of the nuclear fuel rod for fast reactors according to Example 18 of the present invention after the diffusion couple experiment.

Figure 6:
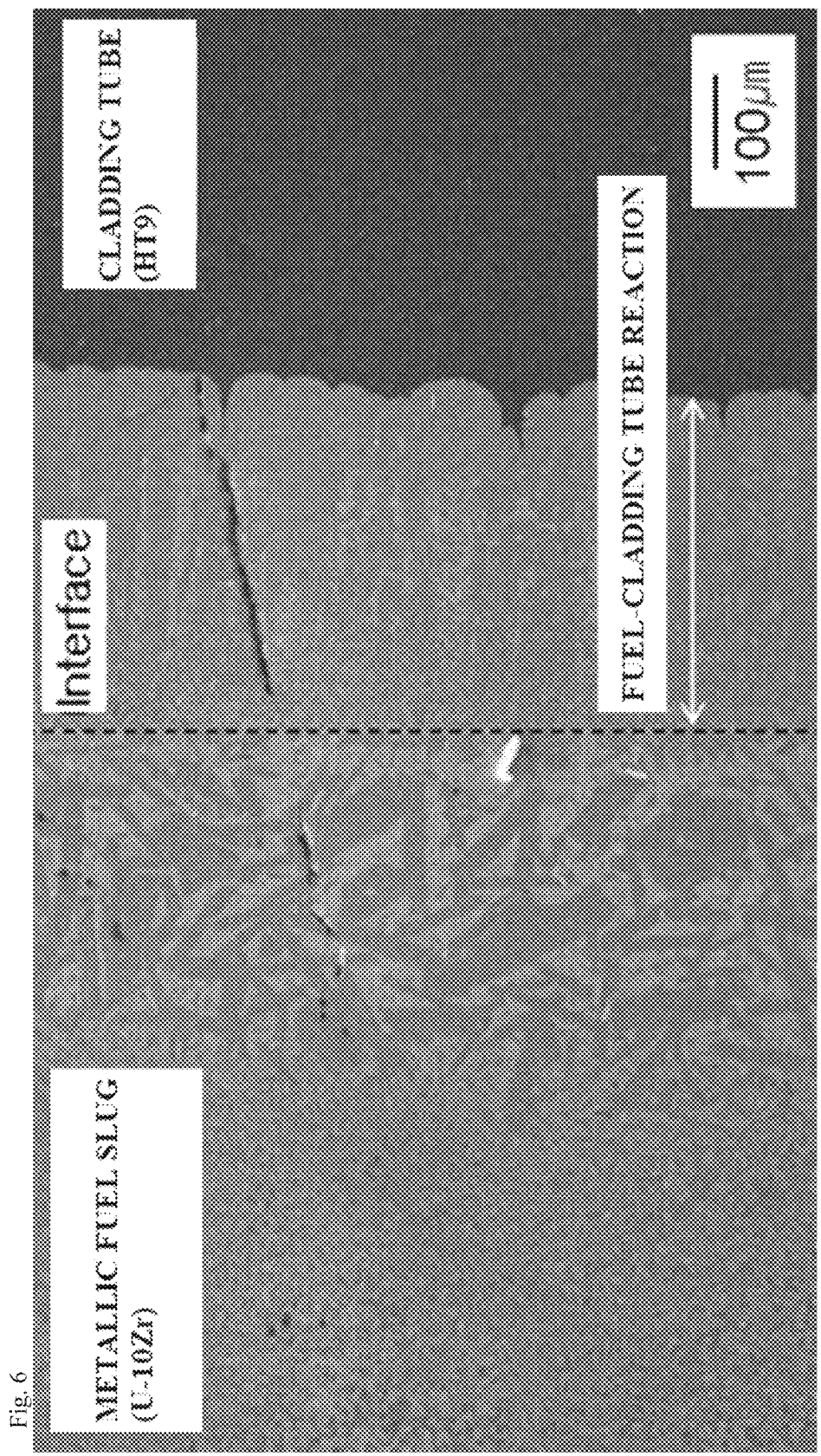
FIG. 6 is a scanning electron microscope image of a cross section of a nuclear fuel rod for fast reactors according to Comparative Example 1 of the present invention after a diffusion couple experiment.

FIG. 6 is a scanning electron microscope image of the cross section of the nuclear fuel rod for fast reactors according to Comparative Example 1 of the present invention after the diffusion couple experiment.

As illustrated in FIGS. 2 to 6, with respect to Example 1 (FIG. 2), Example 2 (FIG. 3), Example 3 (FIG. 4), and Example 18 (FIG. 5), it was observed that the interactions between the metallic fuel slugs and the cladding tubes did not occur because dense oxide layers and nitride layer were formed on the surfaces of the metallic fuel slugs. In contrast, with respect to Comparative Example 1 (FIG. 6), it may be observed that the metallic fuel slug material and the cladding tube material were interdiffused and reacted during the diffusion couple experiment.

Therefore, the nuclear fuel rod for fast reactors that includes the surface treated metallic fuel slug and the cladding tube according to the present invention had an excellent effect of stabilizing components of the metallic fuel slug and fission products or impurities, because the interdiffusion between the metallic fuel slug and the cladding tube did not occur. Also, since the uniform coating on the surface of the metallic fuel slug may be facilitated and fabrication costs may be significantly reduced in comparison to a typical technique of using a functional material for preventing the interdiffusion at an inner surface of the cladding tube, it may be suitable for fabricating the nuclear fuel rod for fast reactors. Furthermore, according to the present invention, since a rare earth element, which is included on the surface of a metallic fuel fabricated by pyroprocessing to degrade the performance of the metallic fuel, may be transformed into a non-active compound, such as oxide, nitride, and carbide, the improvement of the performance of the metallic fuel and the extension of the lifetime of the metallic fuel may be expected.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fast reactor nuclear fuel element comprising:
a metallic fuel slug,
the fuel slug consisting essentially of a uranium (U) and zirconium (Zr) alloy; a protective coating layer of an oxide layer,
the protective coating layer is coated on a surface of the fuel slug, which causes
the fuel slug to be coated with a single protective coating layer of an oxide layer,
the single protective coating layer is formed by oxidation of the fuel slug, thickness of the single protective coating layer is in a range of 0.5 μm to 100 μm, and
the single protective coating layer is preformed on the fuel slug surface prior to fuel slug usage in a fast reactor,
the single protective coating layer is configured to prevent interdiffusion between the fuel slug and a cladding tube, to prevent the cladding tube from thinning during fission operation in the fast reactor.

2. A nuclear fuel rod configured for use with a fast reactor comprising:
a fast reactor nuclear fuel element of claim 1; and
a cladding tube sealing the metal fuel slug.

3. The nuclear fuel rod as set forth in claim 2, wherein the cladding tube comprises one or more selected from the group consisting of iron (Fe), chromium (Cr), tungsten (W), molybdenum (Mo), vanadium (V), titanium (Ti), niobium (Nb), tantalum (Ta), silicon (Si), manganese (Mn), nickel (Ni), carbon (C), nitrogen (N), and boron (B).

* * * * *